United States Patent
Hoshino et al.

(10) Patent No.: US 10,529,964 B2
(45) Date of Patent: Jan. 7, 2020

(54) ENERGY STORAGE APPARATUS

(71) Applicants: GS Yuasa International Ltd., Kyoto-Shi, Kyoto (JP); Honda Motor Co., Ltd., Tokyo (JP)

(72) Inventors: Motoki Hoshino, Kyoto (JP); Masao Kawata, Saitama (JP); Jun Machida, Saitama (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 834 days.

(21) Appl. No.: 14/814,021

(22) Filed: Jul. 30, 2015

(65) Prior Publication Data

US 2016/0036021 A1 Feb. 4, 2016

(30) Foreign Application Priority Data

Jul. 30, 2014 (JP) .................................. 2014-155012

(51) Int. Cl.
| | |
|---|---|
| *H01M 2/00* | (2006.01) |
| *H01M 2/10* | (2006.01) |
| *H01G 4/38* | (2006.01) |
| *H01G 11/10* | (2013.01) |

(52) U.S. Cl.
CPC ............ *H01M 2/1077* (2013.01); *H01G 4/38* (2013.01); *H01G 11/10* (2013.01); *H01M 2220/20* (2013.01); *Y02E 60/13* (2013.01); *Y02T 10/7022* (2013.01)

(58) Field of Classification Search
CPC .. H01M 2/1077; H01M 2220/20; H01G 4/38; H01G 11/10; Y02E 60/13; Y02T 10/7022
See application file for complete search history.

(56) References Cited

U.S. PATENT DOCUMENTS

| | | | |
|---|---|---|---|
| 2009/0017367 | A1 | 1/2009 | Marubayashi |
| 2010/0196749 | A1* | 8/2010 | Yoshida .............. H01M 2/0242 |
| | | | 429/99 |
| 2011/0262799 | A1 | 10/2011 | Kim |
| 2012/0052516 | A1 | 3/2012 | Baudin-Creuza et al. |
| 2012/0141855 | A1 | 6/2012 | Okada et al. |
| 2013/0189559 | A1 | 7/2013 | Giere |

FOREIGN PATENT DOCUMENTS

| | | |
|---|---|---|
| JP | H09-76769 A | 3/1997 |
| JP | 2009-021048 A | 1/2009 |
| JP | 2010-272517 A | 12/2010 |

(Continued)

OTHER PUBLICATIONS

Machine translation of JP 2012-160347 obtained Oct. 19, 2018 (Year: 2012).*

*Primary Examiner* — Nicholas P D'Aniello
(74) *Attorney, Agent, or Firm* — McGinn IP Law Group, PLLC (57) ABSTRACT

An energy storage apparatus includes: an energy storage device group including a plurality of energy storage devices arranged in a row in a first direction and a holder that holds the energy storage device group, the group includes two end energy storage devices at both ends of the group; the holder includes a support portion that supports at least one of the energy storage devices arranged between the two end energy storage devices.

20 Claims, 8 Drawing Sheets

(56) References Cited

FOREIGN PATENT DOCUMENTS

| | | |
|---|---|---|
| JP | 2011-228272 A | 11/2011 |
| JP | 2012-022937 A | 2/2012 |
| JP | 2012-123905 A | 6/2012 |
| JP | 2012-160347 A | 8/2012 |
| JP | 2012-256465 A | 12/2012 |
| JP | 2013-045765 A | 3/2013 |
| JP | 2014-044884 A | 3/2014 |
| WO | WO-2014/080797 A1 | 5/2014 |

* cited by examiner

ENERGY STORAGE APPARATUS

CROSS-REFERENCE TO RELATED APPLICATIONS

This application claims the benefit of Japanese patent application No. 2014-155012, filed on Jul. 30, 2014, which is incorporated by reference.

FIELD

The present invention relates to an energy storage apparatus which includes energy storage devices.

BACKGROUND

An electric vehicle or a hybrid electric vehicle requires a power source having a large capacity and hence, an energy storage apparatus which includes a plurality of energy storage devices is used. An energy storage apparatus of this type includes: an energy storage device group which includes a plurality of energy storage devices arranged in a row in a first direction; and a holder which holds the energy storage device group (see JP-A-9-76769, for example). The holder includes: a pair of terminal members which directly or indirectly sandwiches the energy storage device group in the first direction; and a frame which connects the pair of terminal members to each other.

In the above-mentioned energy storage apparatus, both ends of the energy storage device group in the first direction are supported by the pair of terminal members and hence, when the number of energy storage devices is increased, the whole length of the energy storage device group in the first direction is increased. Accordingly, in the above-mentioned energy storage apparatus, there may be a case where, due to the increase of the whole length of the energy storage device group in the first direction, a resonance frequency of the energy storage device group is lowered.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In view of the above-mentioned circumstances, an object of the present invention is to provide an energy storage apparatus where the lowering of a resonance frequency of an energy storage device group can be suppressed.

An energy storage apparatus according to an aspect of the present invention includes: an energy storage device group including a plurality of energy storage devices arranged in a row in a first direction and a holder that holds the energy storage device group, the group includes two end energy storage devices at both ends of the group; the holder includes a support portion that supports at least one of the energy storage devices arranged between the two end energy storage devices.

BRIEF DESCRIPTION OF DRAWINGS

The foregoing and other features of the present invention will become apparent from the following description and drawings of an illustrative embodiment of the invention in which.

DESCRIPTION OF EMBODIMENTS

According to an aspect of the present invention, there is provided an energy storage apparatus which includes: an energy storage device group including a plurality of energy storage devices arranged in a row in a first direction and a holder that holds the energy storage device group, the group includes two end energy storage devices at both ends of the group; the holder includes a support portion that supports at least one of the energy storage devices arranged between the two end energy storage devices.

With this configuration, the energy storage device group is supported by the holder. Accordingly, in the energy storage apparatus, when the number of energy storage devices is increased, the whole length of the energy storage device group in the first direction is increased.

On the other hand, in the energy storage apparatus, at least one energy storage device arranged between two energy storage devices arranged at both ends of the energy storage device group respectively in the first direction is supported by the support portion of the holder. Therefore, in the energy storage apparatus having the above-mentioned configuration, intervals between the portions which support the energy storage device group can be shortened. Accordingly, the energy storage apparatus can increase a resonance frequency of the energy storage device group.

In the energy storage apparatus having the above-mentioned configuration, it is not always necessary for the support portion to be brought into direct or indirect contact with the energy storage devices. Provided that the energy storage apparatus is configured such that the support portion is brought into direct or indirect contact with the energy storage devices when vibrations are applied to the energy storage device group, a resonance frequency of the energy storage device group can be increased by the support portions.

As one mode of the present invention, the support portion may project toward the energy storage device.

With this configuration, the support portion can be easily brought into direct or indirect contact with the energy storage devices. Accordingly, the energy storage apparatus can support the energy storage devices with more certainty. In this case, the support portion may have rigidity.

With this configuration, the energy storage devices can be supported with more certainty. Accordingly, in the above-mentioned energy storage apparatus, a resonance frequency of the energy storage device group can be increased with more certainty.

Further, as another mode of the present invention, the support portion may support the energy storage device arranged at a center position in the first direction out of the energy storage devices that the energy storage device group includes.

With this configuration, intervals between the portions which support the energy storage device group can be set equal or substantially equal. That is, intervals between the support portion and respective end portions of the energy storage device group in the first direction can be set equal or substantially equal. Accordingly, in the above-mentioned energy storage apparatus, it is possible to prevent that a resonance frequency of the energy storage device group locally changes.

Further, as another mode of the present invention, the holder may include: a pair of terminal members that directly or indirectly sandwiches both ends of the energy storage device group in the first direction; and a frame that connects the pair of terminal members to each other, and the support portion may be formed on the frame.

In this case, the frame may include a connecting portion extending in the first direction and forming a long side of the frame, and the support portion may extend from the connecting portion in a second direction orthogonal to the first direction.

In the energy storage apparatus having the above-mentioned configuration, the support portion is formed of a portion which extends from the connecting portion in the second direction and hence, the energy storage devices can be supported with the simple configuration.

As still another mode of the present invention, the energy storage apparatus may further include, an inner spacer arranged between the energy storage devices arranged adjacent to each other in the first direction out of the plurality of energy storage devices, and the support portion may support two energy storage devices through the inner spacer.

With this configuration, two energy storage devices can be supported by one support portion. Accordingly, the energy storage apparatus can increase a resonance frequency of the energy storage device group with more certainty.

In this case, a length of the support portion in the first direction may be set smaller than a length of the inner spacer in the first direction.

As still another mode of the present invention, a length of the support portion in the first direction may be set larger than a length of the energy storage device in the first direction.

As still another mode of the present invention, the support portion may be configured to push the energy storage device.

With this configuration, the support portion applies a pushing force to the energy storage devices and hence, the energy storage devices can be supported with more certainty. Accordingly, the energy storage apparatus can further increase a resonance frequency of the energy storage device group.

Due to the above-mentioned configuration, according to the present invention, it is possible to provide an energy storage apparatus where the lowering of a resonance frequency of an energy storage device group can be suppressed.

Hereinafter, an energy storage apparatus according to one embodiment of the present invention is described with reference to drawings.

Figure 1:
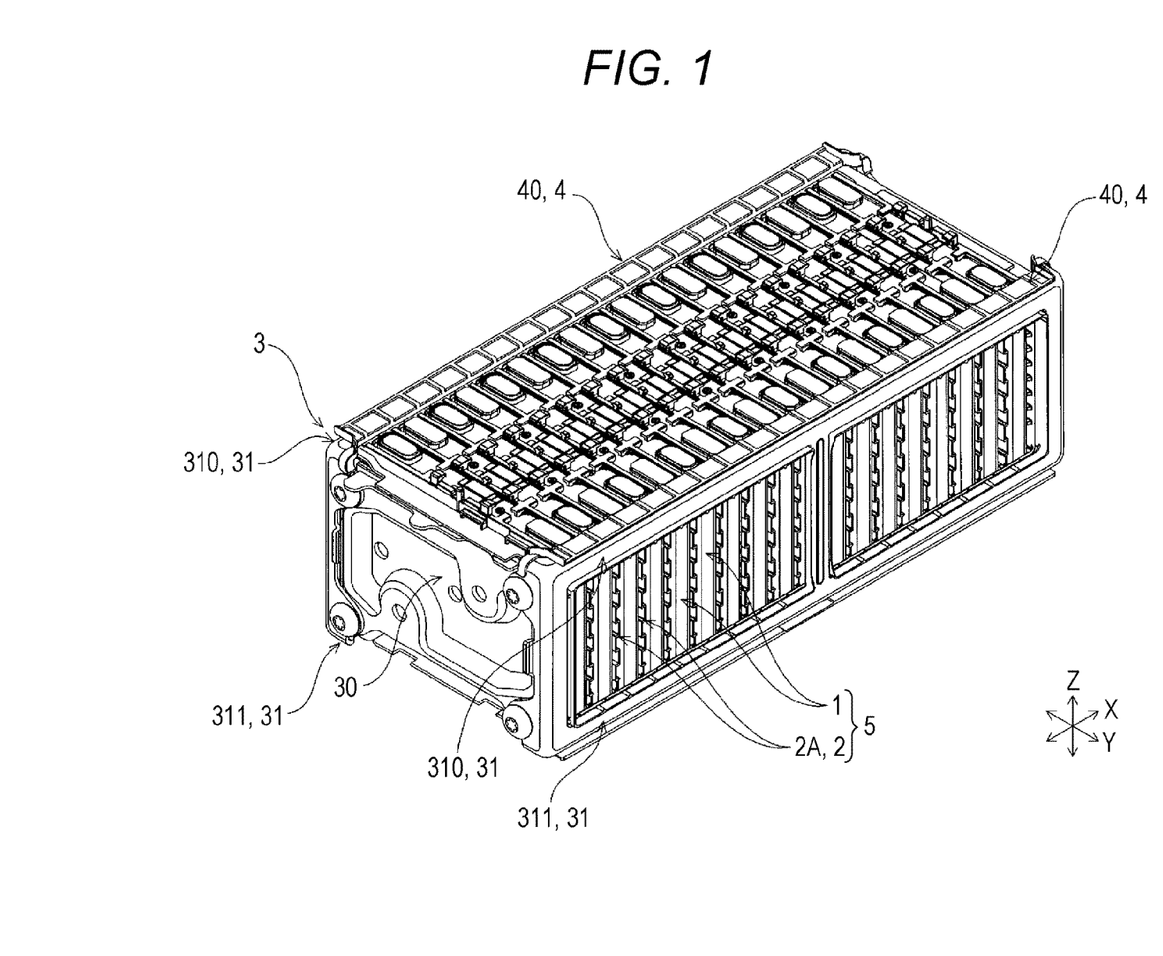
FIG. 1 is a perspective view of an energy storage apparatus according to one embodiment of the present invention.

As shown in FIG. 1, an energy storage apparatus includes: energy storage devices 1; spacers 2 which are arranged adjacent to the energy storage devices 1; and a holder 3 which collectively holds the energy storage devices 1 and the spacers 2. The holder 3 is formed with an electrically conductive material. In view of such configuration, the energy storage apparatus also includes insulators 4 which are arranged between the energy storage devices 1 and the holder 3.

Figure 2:
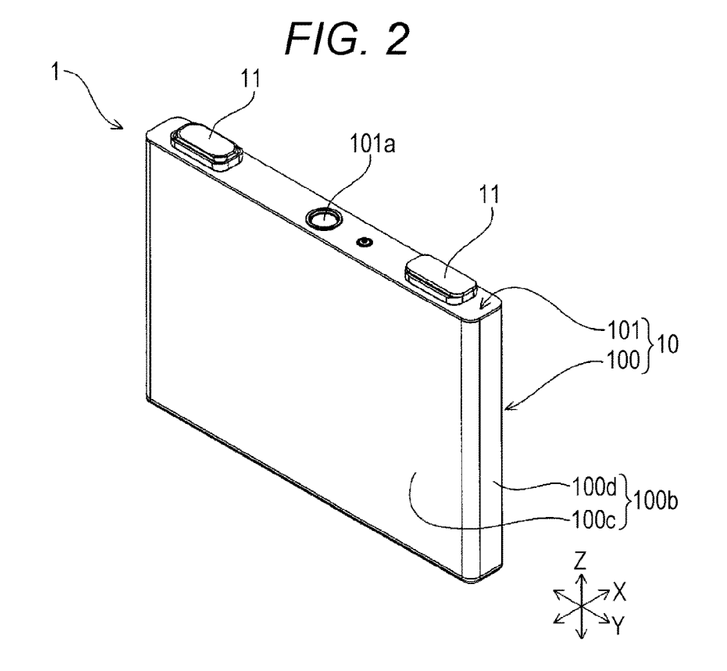
FIG. 2 is a perspective view of an energy storage device in the energy storage apparatus according to the embodiment.
Figure 3:
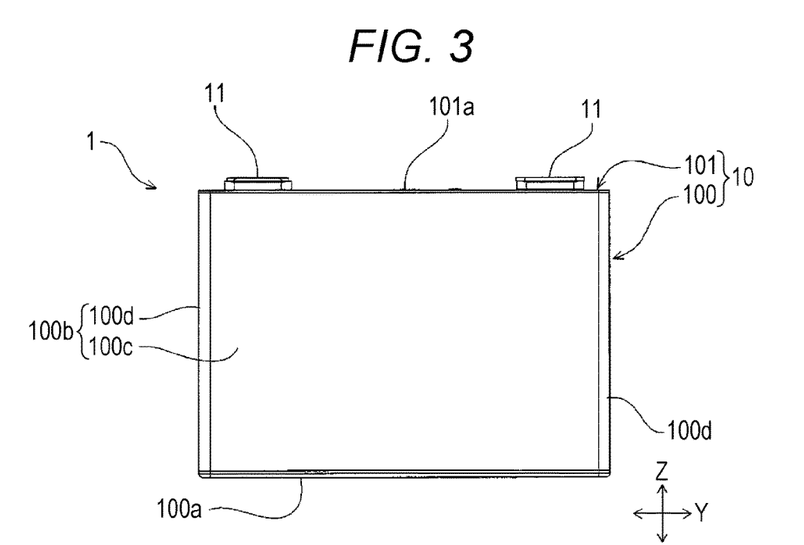
FIG. 3 is a front view of the energy storage device in the energy storage apparatus according to the embodiment.

As shown in FIG. 2 and FIG. 3, the energy storage device 1 includes: an electrode assembly which includes a positive electrode and a negative electrode; a case 10 which houses the electrode assembly; and a pair of external terminals 11 arranged on an outer surface of the case 10.

The case 10 includes: a case body 100 having an opening; and a lid plate 101 which closes the opening of the case body 100 and has the pair of external terminals 11 arranged on an outer surface thereof.

The case body 100 includes: a closed portion 100*a* (see FIG. 3); and a cylindrical barrel portion 100*b* which is connected to a periphery of the closed portion 100*a* so as to surround the closed portion 100*a*.

The barrel portion 100*b* includes: a pair of first walls 100*c* which face each other with a distance therebetween; and a pair of second walls 100*d* which face each other with the pair of first walls 100*c* interposed therebetween.

The first wall 100*c* and the second wall 100*d* are respectively formed into a rectangular shape. That is, respective surfaces of the first wall 100*c* and the second wall 100*d* are flat surfaces and form a rectangular region. The first wall 100*c* and the second wall 100*d* are arranged adjacent to each other in a state where respective edges of the first and second walls 100*c*, 100*d* abut each other. In view of such configuration, an edge of the first wall 100*c* and an edge of the second wall 100*d* are connected to each other over the entire length. Accordingly, the barrel portion 100*b* is formed into an angular cylindrical shape. One end of the barrel portion 100*b* is closed by the closed portion 100*a*. The other end of the barrel portion 100*b* is opened, and is closed by the lid plate 101.

In this embodiment, a surface area of the first wall 100*c* is set larger than a surface area of the second wall 100*d*. In view of such configuration, the barrel portion 100*b* is formed into a flat angular cylindrical shape.

The energy storage apparatus according to this embodiment includes a plurality of energy storage devices 1. The plurality of respective energy storage devices 1 are arranged in a row in the first direction. In this embodiment, the plurality of the respective energy storage devices 1 are arranged in a row in a state where the first walls 100*c* of the cases 10 are directed in one direction. The energy storage apparatus includes a bus bar (not shown in the drawings) which electrically connects the external terminals 11 of two neighboring energy storage devices 1.

In the description made hereinafter, for the sake of convenience, the direction (first direction) along which the energy storage devices 1 are arranged in a row is referred to as the X axis direction. Further, out of two axial directions which are orthogonal to the direction (X axis direction) along which the energy storage devices 1 are arranged in a row, one direction (second direction) is referred to as the Y axis direction, and the remaining one direction (third direction) is referred to as the Z axis direction. In accordance with such a coordinate system, in the respective drawings, three orthogonal axes (coordinate axes) which respectively correspond to the X axis direction, the Y axis direction and the Z axis direction are described complementarily.

The spacers 2 have insulating property. The spacer 2 includes: a base which is arranged adjacent to the case 10

(the first wall 100*c* of the barrel portion 100*b*) of the energy storage device 1; and restricting portions which prevent the positional displacement of the energy storage devices 1 arranged adjacent to the base. The spacer 2 also includes an opposedly-facing portion which faces a closed portion 100*a* of at least one energy storage device 1 out of the energy storage devices 1 arranged adjacent to the spacer 2.

Figure 4:
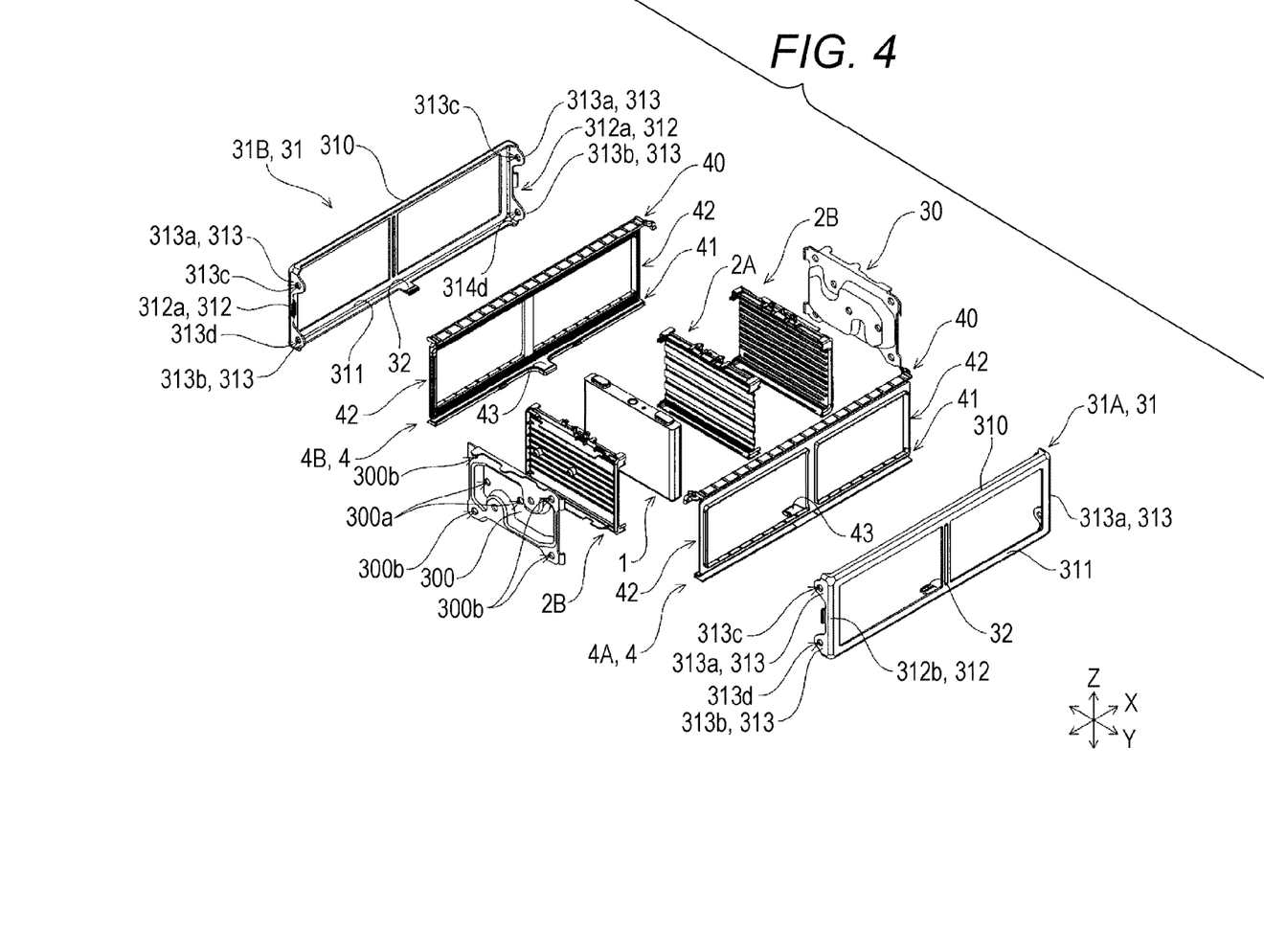
FIG. 4 is a perspective view of the energy storage apparatus according to the embodiment.

The spacers 2 are described more specifically. As described above, the energy storage apparatus includes the plurality of energy storage devices 1. In view of such configuration, as shown in FIG. 4, the energy storage apparatus includes two kinds of spacers 2 (2A, 2B). That is, the energy storage apparatus includes, as the spacers 2, the spacers 2A each of which is arranged between two energy storage devices 1 (hereinafter referred to as "inner spacers"); and the spacers 2B which are arranged adjacent to the energy storage devices 1 arranged at both ends respectively out of the plurality of the energy storage devices 1 (hereinafter referred to as "outer spacers").

Figure 5:
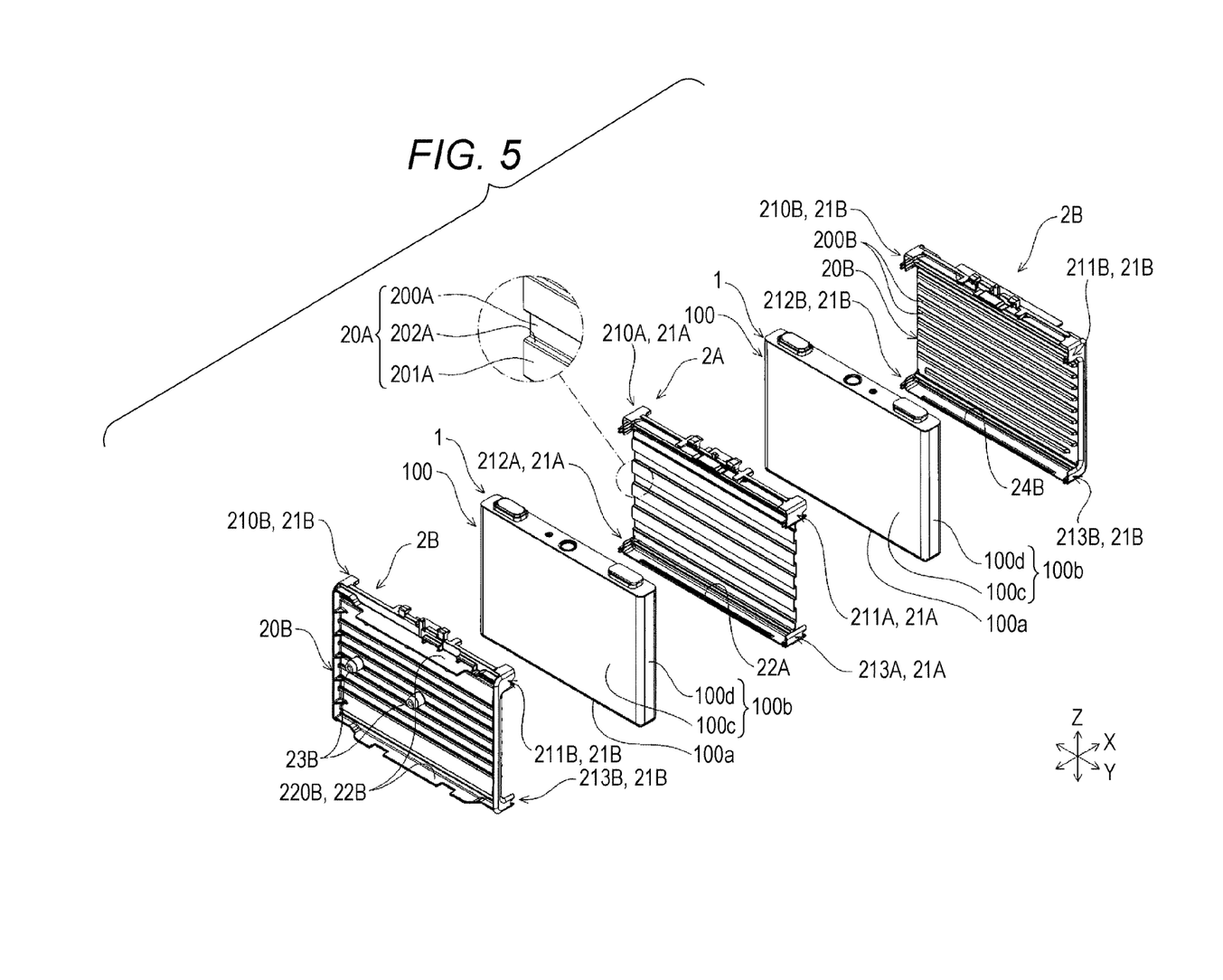
FIG. 5 is a perspective view of inner spacers, outer spacers and the energy storage devices in the energy storage apparatus according to the embodiment.

Firstly, the inner spacer 2A is described. As shown in FIG. 5, the inner spacer 2A includes: a base 20A arranged adjacent to the energy storage device 1 (the first wall 100*c* of the case body 100); and the restricting portions 21A which prevent the positional displacement of two energy storage devices 1 arranged adjacent to the base 20A. The inner spacer 2A also includes an opposedly-facing portion 22A which faces the closed portion 100*a* of at least one energy storage device 1 out of the energy storage devices 1 arranged adjacent to the inner spacer 2A.

The base 20A of the inner spacer 2A is sandwiched between two energy storage devices 1. Accordingly, the base 20A of the inner spacer 2A has: a first surface which faces one energy storage device 1 in an opposed manner out of two energy storage devices 1 arranged adjacent to the inner spacer 2A; and a second surface which is disposed on a side opposite to the first surface and faces the other energy storage device 1 in an opposed manner out of two energy storage devices 1.

The base 20A of the inner spacer 2A has: a first end arranged at a position corresponding to the lid plate 101 of the energy storage device 1: and a second end which is disposed on a side opposite to the first end and at a position corresponding to the closed portion 100*a* of the energy storage device 1. The base 20A of the inner spacer 2A also has: a third end arranged at a position corresponding to one second wall 100*d* of the energy storage device 1; and a fourth end which is disposed on a side opposite to the third end and at a position corresponding to the other second wall 100*d* of the energy storage device 1.

The base 20A of the inner spacer 2A has: a first corner portion where the first end and the third end of the base 20A are connected to each other; and a second corner portion where the first end and the fourth end of the base 20A are connected to each other. The base 20A of the inner spacer 2A also includes: a third corner portion where the second end and the third end of the base 20A are connected to each other; and a fourth corner portion where the second end and the fourth end of the base 20A are connected to each other.

The first end and the second end of the base 20A of the inner spacer 2A extend in the Y axis direction. The third end and the fourth end of the base 20A of the inner spacer 2A extend in the Z axis direction. Accordingly, the base 20A of the inner spacer 2A is formed into an approximately rectangular shape. The base 20A of the inner spacer 2A is formed to have a size approximately equal to a size of the first wall 100*c* of the energy storage device 1.

In the energy storage apparatus according to this embodiment, ventilation passages (not indicated by numeral in the drawing) which allows a fluid (cooling fluid) to flow therethrough are formed in at least one of a space formed between the first surface of the base 20A of the inner spacer 2A and the energy storage device 1 and a space formed between the second surface of the base 20A of the inner spacer 2A and the energy storage device 1.

In the energy storage device 1 according to this embodiment, the base 20A of the inner spacer 2A is formed into a rectangular wave shape. The description is made more specifically. The base 20A of the inner spacer 2A includes: first contact portions 200A which are brought into contact with only one energy storage device 1 out of two energy storage devices 1 arranged adjacent to each other; and second contact portions 201A which are brought into contact with only the other energy storage device 1 out of two energy storage devices 1 arranged adjacent to each other. In view of such configuration, the base 20A of the inner spacer 2A includes joint portions 202A each of which is connected with the first contact portion 200A and the second contact portion 201A.

The first contact portion 200A has a long side thereof in the Y axis direction. The second contact portion 201A has a long side thereof in the Y axis direction.

The base 20A of the inner spacer 2A includes: the plurality of first contact portions 200A; and the plurality of second contact portions 201A. The first contact portions 200A and the second contact portions 201A are alternately arranged in the direction along which the first end and the second end of the base 20A of the inner spacer 2A are arranged.

With this configuration, in the energy storage apparatus, the ventilation passage is formed by a surface of the first contact portion 200A on a side opposite to the surface brought into contact with the energy storage device 1 and a pair of joint portions 202A which is connected to the first contact portion 200A. In the energy storage apparatus, the ventilation passage is also formed by a surface of the second contact portion 201A on a side opposite to the surface brought into contact with the energy storage device 1 and a pair of joint portions 202A which is connected to the second contact portion 201A. Accordingly, in the energy storage apparatus, the ventilation passages are formed between the first surface of the base 20A of the inner spacer 2A and the energy storage device 1, and between the second surface of the base 20A of the inner spacer 2A and the energy storage device 1 respectively.

As described above, the inner spacer 2A is arranged between two neighboring energy storage devices 1. Accordingly, the restricting portions 21A are provided so as to restrict the relative movement of two energy storage devices 1 arranged adjacent to the inner spacer 2A. The restricting portions 21A extend toward the energy storage device 1 arranged adjacent to the first surface of the base 20A of the inner spacer 2A and toward the energy storage device 1 arranged adjacent to the second surface of the base 20A of the inner spacer 2A.

The description is made more specifically. The restricting portion 21A is formed on each corner portion of the base 20A of the inner spacer 2A. The inner spacer 2A includes, as the restricting portions 21A: a first restricting portion 210A formed on the first corner portion; a second restricting portion 211A formed on the second corner portion; a third restricting portion 212A formed on the third corner portion; and a fourth restricting portion 213A formed on the fourth corner portion.

The first restricting portion 210A and the second restricting portion 211A extend toward the energy storage device 1 arranged adjacent to the first surface of the base 20A of the inner spacer 2A, and toward the energy storage device 1 arranged adjacent to the second surface of the base 20A of the inner spacer 2A.

The first restricting portion 210A is brought into contact with the lid plate 101 and one second wall 100d of the barrel portion 100b of the energy storage device 1 arranged on both sides of the base 20A of the inner spacer 2A. The second restricting portion 211A is brought into contact with the lid plate 101 and the other second wall 100d of the barrel portion 100b of the energy storage device 1 arranged on both sides of the base 20A of the inner spacer 2A.

The third restricting portion 212A and the fourth restricting portion 213A extend toward the energy storage device 1 arranged adjacent to the first surface of the base 20A of the inner spacer 2A, and toward the energy storage device 1 arranged adjacent to the second surface of the base 20A of the inner spacer 2A.

The third restricting portion 212A is brought into contact with the closed portion 100a and one second wall 100d of the barrel portion 100b of the energy storage device 1 arranged on both sides of the base 20A of the inner spacer 2A. The fourth restricting portion 213A arranged on the other side is brought into contact with the closed portion 100a and the other second wall 100d of the barrel portion 100b of the energy storage device 1 arranged on both sides of the base 20A of the inner spacer 2A.

The opposedly-facing portion 22A of the inner spacer 2A faces the respective closed portions 100a of two energy storage devices 1 arranged adjacent to the inner spacer 2A. The opposedly-facing portion 22A of the inner spacer 2A is formed along the second end of the base 20A of the inner spacer 2A. That is, the opposedly-facing portion 22A of the inner spacer 2A is continuously formed from the third end to the fourth end of the base 20A of the inner spacer 2A.

In this embodiment, the opposedly-facing portion 22A of the inner spacer 2A is brought into contact with an opposedly-facing portion 22A of another inner spacer 2A arranged adjacent to the opposedly-facing portion 22A with the energy storage device 1 interposed therebetween. Accordingly, the closed portion 100a of the energy storage device 1 arranged between two inner spacers 2A is covered by the respective opposedly-facing portions 22A of two inner spacers 2A.

Next, the outer spacer 2B is described. The outer spacer 2B includes: a base 20B (hereinafter referred to as "base") having a first surface which faces the energy storage device 1 (the first wall 100c of the case body 100) and a second surface which is disposed on a side opposite to the first surface; and restricting portions 21B (hereinafter referred to as "restricting portions") which determine the position of the energy storage device 1 arranged adjacent to the base 20B.

In this embodiment, the outer spacer 2B is configured such that the base 20B and a terminal member 30 of the holder 3 described later face each other. That is, the outer spacer 2B is arranged between the energy storage device 1 and the terminal member 30.

With such configuration, the outer spacer 2B has a fitting portion 22B which fits in the terminal member 30 at the position which faces the terminal member 30 of the base 20B. That is, the outer spacer 2B has the fitting portion 22B which determines the position of the terminal member 30 with respect to the base 20B, and is formed on the second surface of the base 20B. The outer spacer 2B also has shaft portions 23B which determine the position of the terminal member 30 with respect to the base 20B, and project from the second surface of the base 20B. The outer spacer 2B further has an opposedly-facing portion 24B which faces the closed portion 100a of the energy storage device 1 arranged adjacent to the outer spacer 2B.

The base 20B of the outer spacer 2B extends in the Y axis direction and the Z axis direction which are orthogonal to the X axis direction. That is, the base 20B is formed in a plate shape. The base 20B of the outer spacer 2B has: a first end arranged at the position corresponding to the lid plate 101 of the energy storage device 1; and a second end disposed on a side opposite to the first end and at the position corresponding to the closed portion 100a of the energy storage device 1. The base 20B of the outer spacer 2B also has a third end arranged at the position corresponding to one second wall 100d of the energy storage device 1; and a fourth end disposed on a side opposite to the third end and at the position corresponding to the other second wall 100d of the energy storage device 1.

The base 20B of the outer spacer 2B has: a first corner portion where the first end and the third end are connected to each other; and a second corner portion where the first end and the fourth end are connected to each other. The base 20B of the outer spacer 2B also has: a third corner portion where the second end and the third end are connected to each other; and a fourth corner portion where the second end and the fourth end are connected to each other.

The first end and the second end of the base 20B of the outer spacer 2B extend in the Y axis direction. The third end and the fourth end of the base 20B of the outer spacer 2B extend in the direction orthogonal to the Z axis direction. Accordingly, the base 20B of the outer spacer 2B has an approximately rectangular shape. The base 20B of the outer spacer 2B has a size substantially equal to a size of the first wall 100c of the energy storage device 1.

On the first surface of the base 20B of the outer spacer 2B, ventilation passages (not indicated by numeral in the drawing) which allows a fluid to flow therethrough are formed in a space formed between the first surface of the base 20B and the energy storage device 1.

The description is made more specifically. The base 20B of the outer spacer 2B has inner contact portions 200B which extend toward the case 10 (the first wall 100c of the case body 100) of the energy storage device 1 from the first surface of the base 20B.

The inner contact portion 200B has a long side thereof in the Y axis direction. In this embodiment, the base 20B of the outer spacer 2B has a plurality of inner contact portions 200B. The plurality of respective inner contact portions 200B are arranged at intervals in the direction orthogonal to the long side direction of the inner contact portion 200B. With this configuration, the plurality of ventilation passages (not indicated by numeral in the drawing) are formed between the base 20B of the outer spacer 2B and the energy storage device 1.

As described above, the first surface of the outer spacer 2B is arranged adjacent to the energy storage device 1. To restrict the relative movement of the energy storage devices 1 arranged adjacent to the first surface of the outer spacer 2B, the restricting portions 21B extend toward the energy storage device 1 arranged adjacent to the first surface of the base 20B of the outer spacer 2B.

The description is made more specifically. The outer spacer 2B has, as the restricting portions 21B: restricting portions 21B formed at the first end of the base 20B; and restricting portions 21B formed at the second end of the base 20B.

The outer spacer 2B includes, as the restricting portions 21B: a first restricting portion 210B formed on the first corner portion; a second restricting portion 211B formed on the second corner portion; a third restricting portion 212B formed on the third corner portion; and a fourth restricting portion 213B formed on the fourth corner portion.

As described above, the first surface of the base 20B of the outer spacer 2B faces the energy storage device 1 in an opposed manner. Accordingly, the first restricting portion 210B and the second restricting portion 211B extend toward the energy storage device 1 arranged adjacent to the first surface of the base 20B of the outer spacer 2B.

The first restricting portion 210B is brought into contact with a first end of the lid plate 101 and the second wall 100d of the barrel portion 100b of the energy storage device 1 arranged adjacent to the first surface of the base 20B of the outer spacer 2B. The second restricting portion 211B is brought into contact with a second end of the lid plate 101 and the second wall 100d of the barrel portion 100b of the energy storage device 1 arranged adjacent to the first surface of the base 20B of the outer spacer 2B.

As described above, the first surface of the base 20B of the outer spacer 2B faces the energy storage device 1 in an opposed manner. Accordingly, the third restricting portion 212B and the fourth restricting portion 213B extend toward the energy storage device 1 arranged adjacent to the first surface of the base 20B of the outer spacer 2B.

The third restricting portion 212B is brought into contact with a first end of the closed portion 100a and the second wall 100d of the barrel portion 100b of the energy storage device 1 arranged adjacent to the first surface of the base 20B of the outer spacer 2B. The fourth restricting portion 213B is brought into contact with the second end of the closed portion 100a and the second wall 100d of the barrel portion 100b of the energy storage device 1 arranged adjacent to the first surface of the base 20B of the outer spacer 2B.

The shaft portions 23B are inserted into insertion holes 300a of the terminal member 30 described later.

An opposedly-facing portion 24B of the outer spacer 2B faces the closed portion 100a of the energy storage device 1 arranged adjacent to the outer spacer 2B in an opposed manner. The opposedly-facing portion 24B of the outer spacer 2B is formed along the second end of the base 20B of the outer spacer 2B. That is, the opposedly-facing portion 24B of the outer spacer 2B is continuously formed from the third end to the fourth end of the base 20B of the outer spacer 2B.

In this embodiment, the opposedly-facing portion 24B of the outer spacer 2B is brought into contact with the opposedly-facing portion 22A of the inner spacer 2A arranged adjacent to the outer spacer 2B with the energy storage device 1 interposed therebetween. Accordingly, the closed portion 100a of the energy storage device 1 arranged between the inner spacer 2A and the outer spacer 2B is covered by the opposedly-facing portion 22A of the inner spacer 2A and the opposedly-facing portion 24B of the outer spacer 2B.

In this embodiment, as described above, the outer spacer 2B is arranged adjacent to the inner spacer 2A with the energy storage device 1 interposed therebetween. That is, the energy storage apparatus includes a pair of outer spacers 2B. The outer spacers 2B are arranged adjacent to the energy storage devices 1 at outermost ends out of the plurality of energy storage devices 1. That is, the pair of outer spacers 2B is provided so as to sandwich the plurality of arranged energy storage devices 1 between the outer spacers 2B.

As described above, the first surfaces of the pair of outer spacers 2B respectively face the case body 100 of the energy storage device 1 in an opposed manner. Accordingly, the pair of outer spacers 2B is arranged such that the first surfaces of the bases 20B of the respective outer spacer 2B face each other. Accordingly, in the energy storage apparatus, the pair of outer spacers 2B is arranged so that the respective outer spacers 2B are symmetrical to each other in the X axis direction.

As described above, the holder 3 collectively holds the energy storage devices 1 and the spacers 2. The description is made more specifically. The holder 3 holds the energy storage device group 5 including the plurality of energy storage devices 1 arranged in the X axis direction (see FIG. 1). In this embodiment, the description is made hereinafter assuming that the energy storage device group 5 is formed of the plurality of energy storage devices 1 and the spacers (inner spacers) 2A each of which is arranged between two energy storage devices 1 arranged adjacent to each other.

In this embodiment, the holder 3 is made of metal. The holder 3 includes: a pair of terminal members 30 which directly or indirectly sandwiches both ends of the energy storage device group 5 in the X axis direction; and frames 31 which connect the pair of terminal members 30 to each other. The holder 3 further includes a support portion 32 which supports at least one energy storage device 1 arranged between two energy storage devices 1 arranged at both ends of the energy storage device group 5 respectively in the X axis direction.

As described above, the energy storage apparatus includes the outer spacers 2B arranged adjacent to the energy storage devices 1 arranged at both sides in the X axis direction (two energy storage devices 1 arranged at both sides of the energy storage device group 5 in the X axis direction) out of the plurality of energy storage devices 1. Accordingly, each of the pair of terminal members 30 is arranged at the position adjacent to each outer spacer 2B as shown in FIG. 4.

Each of the pair of terminal members 30 has: a first surface which faces the outer spacer 2B in an opposed manner; and a second surface which is disposed on a side opposite to the first surface. Each of the pair of terminal members 30 has a pressure contact portion 300 which is brought into contact with the outer spacer 2B.

The terminal member 30 has: a first end arranged at the position corresponding to the lid plate 101 of the energy storage device 1; and a second end disposed on a side opposite to the first end (the second end arranged at the position corresponding to the closed portion 100a of the energy storage device 1). The terminal member 30 also has: a third end arranged at the position corresponding to one second wall 100d of the energy storage device 1; and a fourth end disposed on a side opposite to the third end (fourth end arranged at the position corresponding to the other second wall 100d of the energy storage device 1).

With such configuration, the terminal member 30 has a first corner portion where the first end and the third end are connected to each other; and a second corner portion where the first end and the fourth end are connected to each other. The terminal member 30 also has: a third corner portion where the second end and the third end are connected to each other; and a fourth corner portion where the second end and the fourth end are connected to each other.

The pressure contact portion 300 has insertion hole 300a formed at position corresponding to the shaft portion 23B of the outer spacer 2B. The pressure contact portion 300 has a plurality of (four in this embodiment) through holes 300b which are formed in the corner portions respectively.

The frame 31 has a first connecting portion 310 which extends between the pair of terminal members 30, and is arranged at the position corresponding to the lid plates 101 of the energy storage devices 1; and a second connecting portion 311 which extends between the pair of terminal members 30, and is arranged at the position corresponding to the closed portions 100a of the energy storage devices 1.

The frame 31 also has a pair of bridge portions 312 connected with the first connecting portion 310 and the second connecting portion 311.

In this embodiment, the bridge portions 312 are connected with the first connecting portion 310 and the second connecting portion 311 so that the frame 31 is formed into a frame shape. In view of such configuration, with respect to the energy storage apparatus according to this embodiment, in the description made hereinafter, there may be a case where a part which includes the first connecting portion 310, the second connecting portion 311 and the bridge portion 312 arranged on one side of the energy storage devices in the Y axis direction is assumed as a first connecting member 31A, and a part which includes the first connecting portion 310, the second connecting portion 311 and the bridge portion 312 arranged on the other side of the energy storage device in the Y axis direction is assumed as a second connecting member 31B.

The frame 31 has fixing portions 313 which are connected to the terminal members 30.

The first connecting portion 310 has a first end and a second end on a side opposite to the first end in the direction which forms a long side.

The first connecting portion 310 is bent in the direction orthogonal to the direction which forms a long side. Using a bent portion of the first connecting portion 310 as a boundary, one portion of the first connecting portion 310 is arranged at the position corresponding to the lid plate 101 of the energy storage device 1. Using the bent portion of the first connecting portion 310 as the boundary, the other portion of the first connecting portion 310 is arranged at the position corresponding to the second wall 100d of the energy storage device 1.

The second connecting portion 311 has a first end and a second end on a side opposite to the first end in the direction which forms a long side.

The second connecting portion 311 is bent in the direction orthogonal to the direction along which forms a long side. Using a bent portion of the second connecting portion 311 as a boundary, one portion of the second connecting portion 311 is arranged at the position corresponding to the lid plate 101 of the energy storage device 1. Using the bent portion as the boundary of the second connecting portion 311, the other portion of the second connecting portion 311 is arranged at the position corresponding to the second wall 100d of the energy storage device 1.

The bridge portions 312 include: a first bridge portion 312a which is connected to the first end of the first connecting portion 310 and the first end of the second connecting portion 311; and a second bridge portion 312b which is connected to the second end of the first connecting portion 310 and the second end of the second connecting portion 311.

The fixing portions 313 include: a pair of first fixing portions 313a which is formed at the first end and the second end of the pair of first connecting portions 310 respectively; and a pair of second fixing portions 313b which is formed at the first end and the second end of the pair of second connecting portions 311 respectively.

One first fixing portion 313a faces the through hole 300b formed in one terminal member 30 and a peripheral portion of the through hole 300b. The other first fixing portion 313a faces the through hole 300b formed in the other terminal member 30 and a peripheral portion of the through hole 300b. A first hole portion 313c is formed in each of the pair of first fixing portions 313a at positions corresponding to the through holes 300b.

Accordingly, the first connecting portion 310 is connected to the terminal members 30 by threadedly engaging nuts on bolts which pass through the through holes 300b formed in the terminal members 30 and the first hole portions 313c formed in the first fixing portions 313a.

One second fixing portion 313b faces a portion of one terminal member 30 around the through hole 300b. The other second fixing portion 313b faces a portion of the other terminal member 30 around the through hole 300b. A second hole portion 313d is formed in each of the pair of second fixing portions 313b at positions corresponding to the through holes 300b.

Accordingly, the second connecting portion 311 is connected to the terminal members 30 by threadedly engaging nuts on bolts which pass through the through holes 300b formed in the terminal members 30 and the second hole portions 313d formed in the second fixing portions 313b.

The support portions 32 directly or indirectly support the energy storage device 1. The description is made more specifically. The support portions 32 are brought into direct or indirect contact with the energy storage device 1. In this embodiment, the support portions 32 support the energy storage devices 1 through the spacer 2 (inner spacer 2A).

Figure 6:
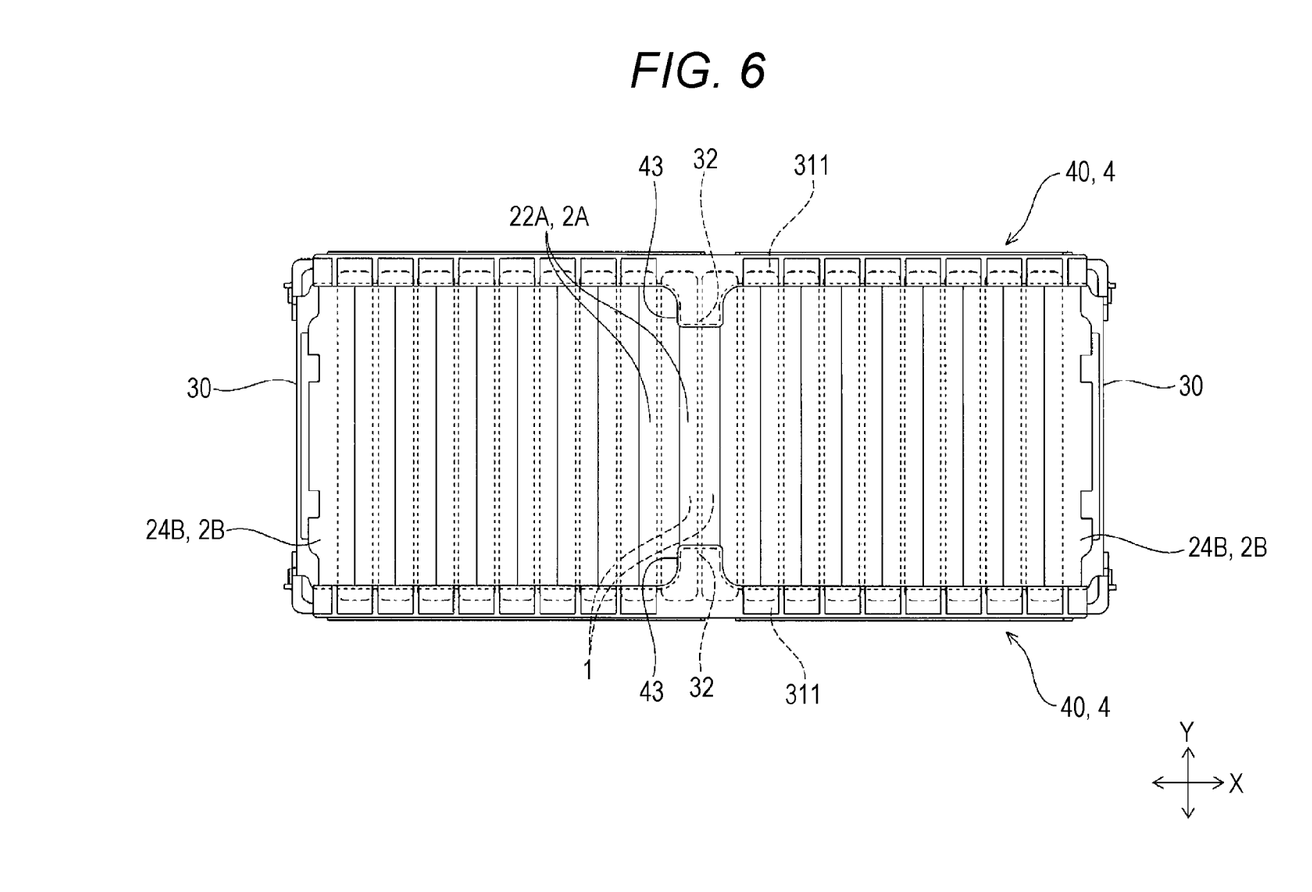
FIG. 6 is a bottom view of the energy storage apparatus according to the embodiment.

As shown in FIG. 6, the support portions 32 support the energy storage device 1 arranged at the center portion in the X axis direction out of the energy storage devices 1 which the energy storage device group 5 includes.

The description is made more specifically. The support portion 32 extends from a center portion of the second connecting portion 311 in the long side direction of the second connecting portion 311. The support portion 32 extends in the Y axis direction from the second connecting portion 311. The support portion 32 has: a first end portion which is connected to the second connecting portion 311; and a second end portion on a side opposite to the first end portion.

As described above, the support portions 32 support the energy storage devices 1 through the inner spacer 2A, and the inner spacer 2A has the opposedly-facing portions 22A which face the respective closed portions 100a of two energy storage devices 1 arranged adjacent to the inner spacer 2A.

Accordingly, the support portion 32 supports the opposedly-facing portions 22A of the inner spacer 2A arranged at the center portion in the X axis direction out of the plurality of inner spacers 2A. That is, the support portions 32 support two energy storage devices 1 arranged adjacent to the inner spacer 2A through the inner spacer 2A arranged at the center portion in the X axis direction out of the plurality of inner spacers 2A.

Figure 7:
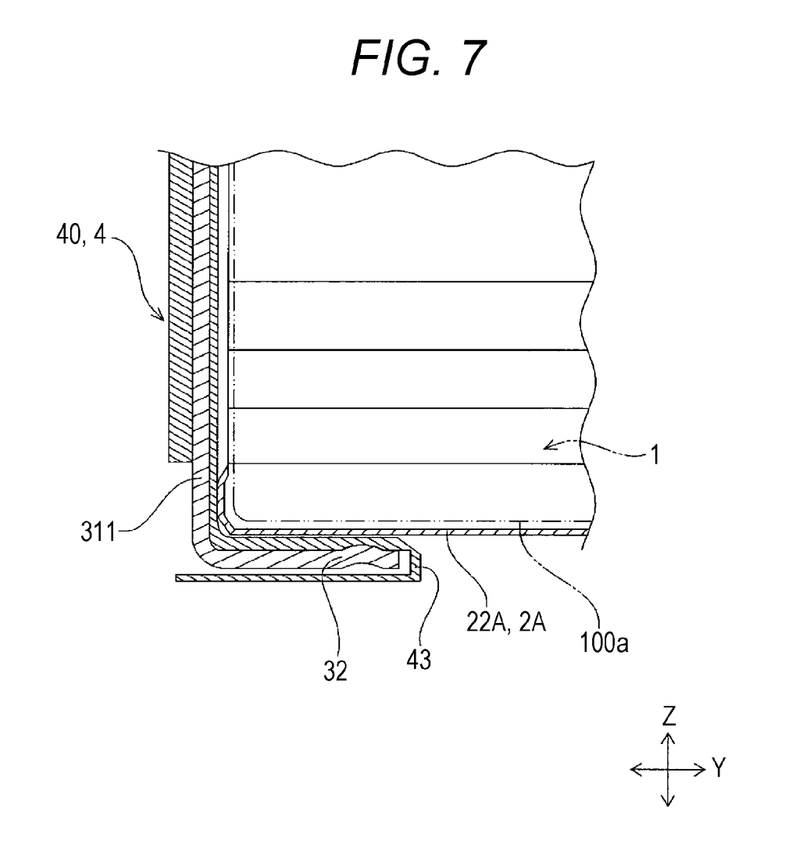
FIG. 7 is a cross-sectional view of the energy storage apparatus according to the embodiment.

The support portion 32 is configured to push the energy storage devices 1. The description is made more specifically. The second end portion of the support portion 32 is arranged at the position closer to the energy storage device group 5 than the first end portion is. In this embodiment, the first end portion of the support portion 32 extends straightly in the Y axis direction. The second end portion of the energy storage device 1 is bent so as to project toward the energy storage device 1 (see FIG. 7). Accordingly, the energy storage apparatus is configured such that when the energy storage device 1 is arranged on the support portion 32, the second end portion of the support portion 32 pushes the energy storage device 1.

Figure 8:
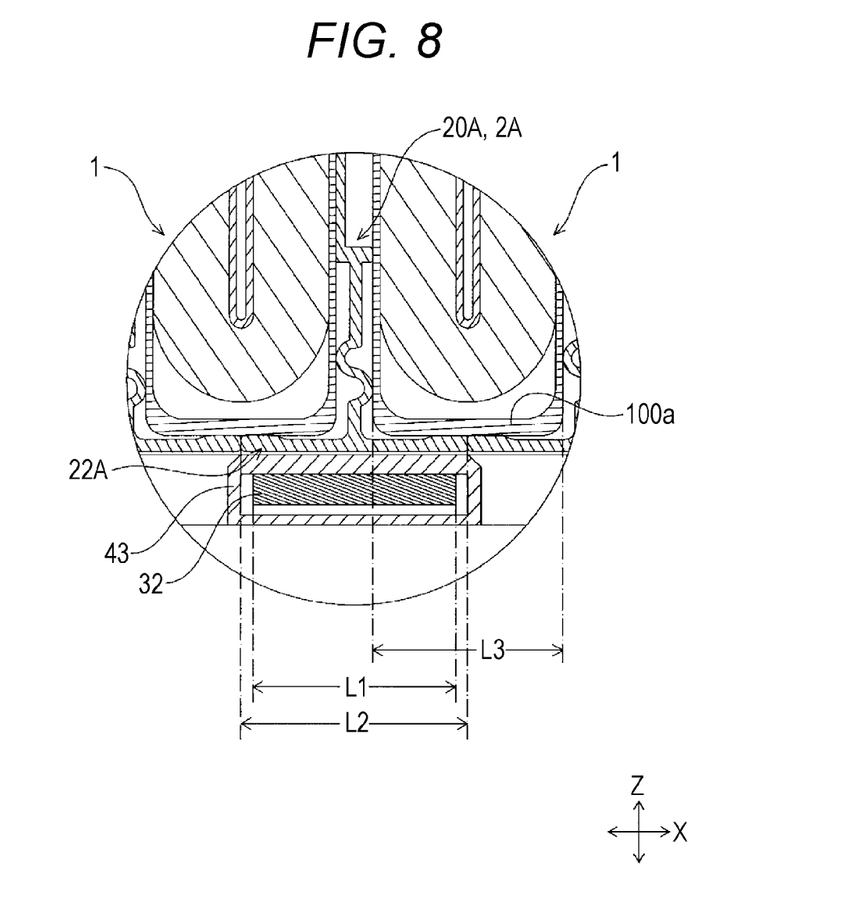
FIG. 8 is a cross-sectional view of the energy storage apparatus according to the embodiment.
Figure 9:
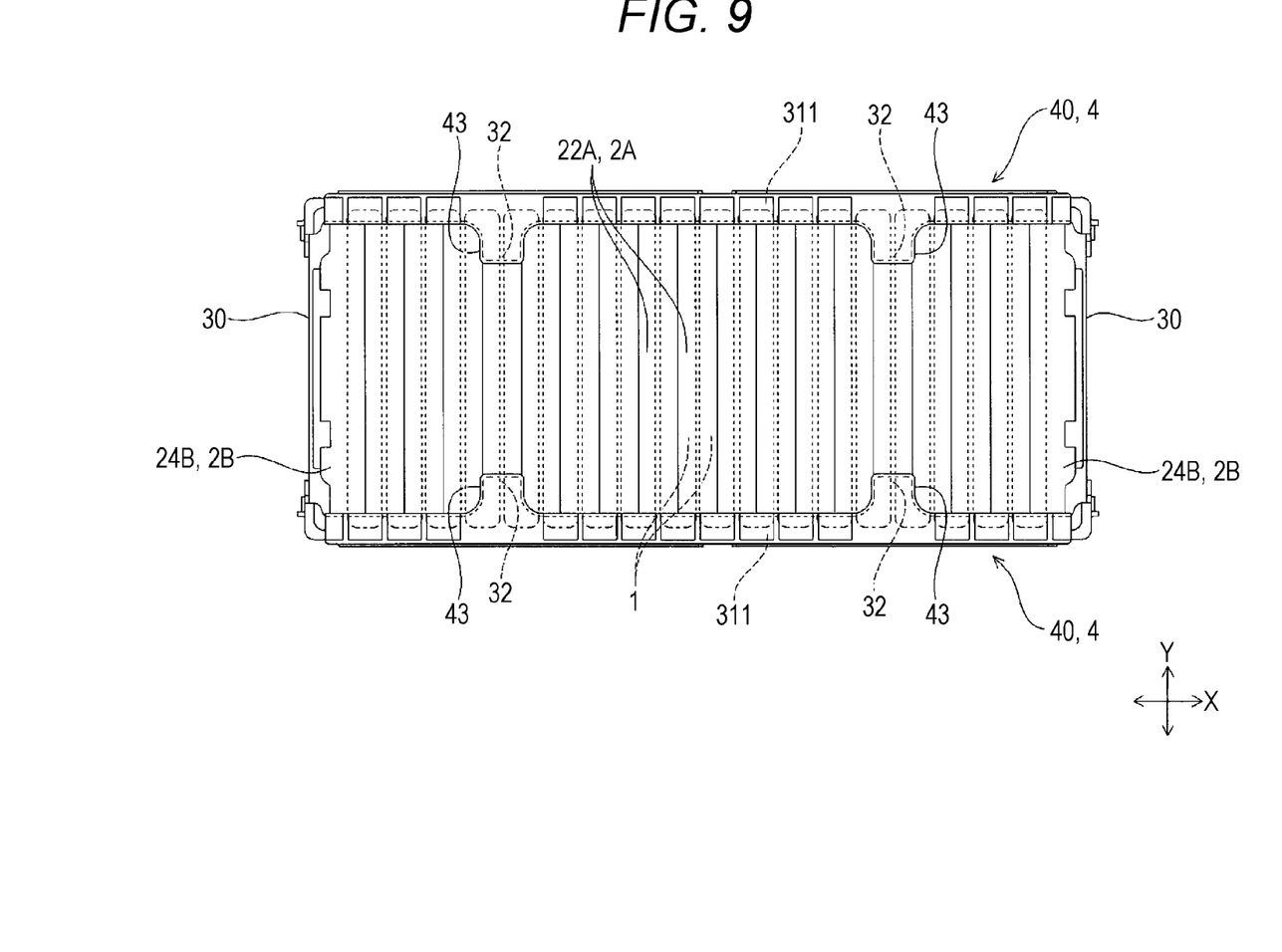
FIG. 9 is a bottom view of an energy storage apparatus according to another embodiment of the present invention.

As shown in FIG. 8, a length L1 of the support portion 32 in the X axis direction may be set smaller than a length L2 of the inner spacer 2A in the X axis direction. The length L1 of the support portion 32 in the X axis direction may be set larger than a length L3 of the energy storage device 1 (the closed portion 100a of the energy storage device 1) in the X axis direction. It is preferable that the support portion 32 have rigidity.

The insulator 4 is made of a material having insulation property. The insulator 4 has: a first insulating portion 40 arranged between the first connecting portion 310 and the spacers 2 (the inner spacers 2A and the outer spacers 2B); and a second insulating portion 41 arranged between the second connecting portion 311 and the spacers 2 (the inner spacer 2A and the outer spacers 2B).

The insulator 4 has third insulating portions 42 connected with the first insulating portion 40 and the second insulating portion 41. The insulator 4 has a fourth insulating portion 43 which extends from the second insulating portion 41.

The first insulating portion 40 has a long side thereof extending in the X axis direction. The first insulating portion 40 is sandwiched between the first connecting portion 310 and the spacers 2. That is, the first insulating portion 40 is bent in the direction orthogonal to the long side direction. Using a bent portion of the first insulating portion 40 as a boundary, one portion of the first insulating portion 40 is brought into contact with one portion of the first connecting portion 310 using a bet portion of the first connecting portion 310 as a boundary. Further, using the bent portion of the first insulating portion 40 as the boundary, the other portion of the first insulating portion 40 is brought into contact with the other portion of the first connecting portion 310 using the bent portion of the first connecting portion 310 as the boundary.

The second insulating portion 41 has a long side in the X axis direction. The second insulating portion 41 is sandwiched between the second connecting portion 311 and the spacers 2. That is, the second insulating portion 41 is bent in the direction orthogonal to the direction which forms a long side. Using a bent portion of the second insulating portion 41 as a boundary, one portion of the second insulating portion 41 is brought into contact with one portion of the second connecting portion 311 using a bent portion of the second connecting portion 311 as a boundary. Using the bent portion of the second insulating portion 41 as the boundary, the other portion of the second insulating portion 41 is brought into contact with the other portion of the second connecting portion 311 using the bent portion of the second connecting portion 311 as the boundary.

In this embodiment, the insulator 4 has two third insulating portions 42. The description is made more specifically. In the insulator 4, a first end of the first insulating portion 40 and a first end of the second insulating portion 41 are connected to each other by the third insulating portion 42, and a second end of the first insulating portion 40 and a second end of the second insulating portion 41 are connected to each other by the third insulating portion 42.

The fourth insulating portion 43 is arranged at the position corresponding to the support portion 32 of the frame 31.

As described above, in the energy storage apparatus according to this embodiment, both ends of the energy storage device group 5 in the X axis direction are sandwiched by the pair of terminal members 30. That is, in the energy storage apparatus, both ends of the energy storage device group 5 in the X axis direction are supported by the pair of terminal members 30.

Accordingly, in the energy storage apparatus, when the number of energy storage devices 1 is increased, a whole length of the energy storage device group 5 in the X axis direction is increased. Intervals between portions which support the energy storage device group 5 (a distance between the pair of terminal members 30 in this embodiment) are increased.

In the energy storage apparatus, at least one energy storage device 1 arranged between two energy storage devices 1 arranged at both ends of the energy storage device group 5 respectively in the X axis direction is supported by the support portions 32. Accordingly, in the energy storage apparatus having the above-mentioned configuration, intervals between the portions which support the energy storage device group 5 can be shortened and hence, the energy storage apparatus can acquire an excellent advantageous effect that a resonance frequency of the energy storage device group 5 can be increased.

The support portion 32 is formed so as to project toward the energy storage device 1 and hence, the support portion 32 is easily brought into direct or indirect contact with the energy storage device 1. Accordingly, the energy storage apparatus can support the energy storage device 1 with more certainty.

The support portions 32 support the energy storage device 1 arranged at the center portion in the X axis direction out of the energy storage devices 1 which the energy storage device group 5 includes. Accordingly, in the energy storage apparatus, distances between the portions which support the energy storage device group 5 can be set equal or substantially equal. That is, in the energy storage apparatus, the distance between the terminal member 30 and the support portion 32 arranged adjacent to the terminal member 30, and the distance between the support portions 32 can be set equal or substantially equal. Accordingly, in the energy storage apparatus, it is possible to prevent that a resonance frequency of the energy storage device group 5 locally changes.

Further, in the energy storage apparatus of this embodiment, the support portion 32 is formed of a portion which extends from the second connecting portion 311 in the Y axis direction and hence, the energy storage devices 1 can be supported with the simple configuration.

The support portion 32 supports two energy storage devices 1 by way of the inner spacer 2A and hence, two energy storage devices 1 can be supported by one support portion 32. Accordingly, the energy storage apparatus can increase a resonance frequency of the energy storage device group 5 with more certainty.

The support portion 32 pushes the energy storage device 1.

Accordingly, the support portion 32 applies a pushing force to the energy storage devices 1 and hence, the energy storage devices 1 can be supported with more certainty. Accordingly, the energy storage apparatus can further increase a resonance frequency of the energy storage device group 5.

It is needless to say that the energy storage apparatus according to the present invention is not limited to the above-mentioned one embodiment, and various modifications are conceivable without departing from the gist of the present invention.

In the above-mentioned embodiment, the base 20A of the inner spacer 2A has an approximately rectangular shape, and has a size substantially equal to a size of the first wall 100c of the energy storage device 1. However, provided that the base 20A of the inner spacer 2A can make respective postures of two energy storage devices 1 arranged adjacent to the inner spacer 2A correspond to each other, a shape of the base 20A of the inner spacer 2A is not limited to an approximately rectangular shape, and a size of the base 20A of the inner spacer 2A is also not limited to a size approximately equal to the size of the first wall 100*c* of the energy storage device 1.

In the above-mentioned embodiment, the ventilation passages are formed between the base 20A and the energy storage device 1 by forming the base 20A of the inner spacer 2A into a rectangular wave shape. However, provided that a fluid is allowed to pass through between the first surface and the energy storage device 1 (between the second surface and the energy storage device 1), a shape of the base 20A of the inner spacer 2A is not limited to a rectangular wave shape. Further, when it is unnecessary to form a ventilation passage between the base 20A of the inner spacer 2A and the energy storage device 1, the base 20A of the inner spacer 2A may be formed into a flat plate shape.

In the above-mentioned embodiment, the restricting portions 21A of the inner spacer 2A are formed at the corner portions of the base 20A respectively. However, provided that the position of the energy storage device 1 with respect to the base 20A can be determined, the positions where the restricting portions 21A of the inner spacer 2A are formed on the base 20A are not limited.

In the above-mentioned embodiment, the base 20B of the outer spacer 2B has an approximately rectangular shape, and has a size approximately equal to a size of the first wall 100*c* of the energy storage device 1. However, provided that the base 20B can make the postures of the energy storage device 1 and the terminal member 30 arranged adjacent to each other correspond to each other, a shape of the base 20B is not limited to an approximately rectangular shape, and a size of the base 20B is also not limited to a size approximately equal to the size of the first wall 100*c* of the energy storage device 1.

In the above-mentioned embodiment, in the outer spacer 2B, the restricting portions 21B are formed at the corner portions of the base 20B respectively. However, provided that the restricting portions 21B can determine a position of the energy storage device 1 with respect to the base 20B, the positions where the restricting portion 21B are formed on the base 20B are not limited.

In the above-mentioned embodiment, the energy storage apparatus includes the energy storage devices 1 and the spacers 2 in a state where the energy storage device 1 and the spacer 2 are arranged adjacent to each other. However, the energy storage apparatus is not limited to such configuration, and the energy storage devices 1 may be arranged adjacent to each other, for example.

In the above-mentioned embodiment, the support portion 32 is configured to support two energy storage devices 1. However, the energy storage apparatus of this disclosure is not limited to such configuration and, for example, the support portion 32 may support one energy storage device 1 or may support three or more energy storage devices 1.

In the above-mentioned embodiment, the support portion 32 extends from the center portion of the second connecting portion 311 in the long side direction of the second connecting portion 311. However, the energy storage apparatus of this disclosure is not limited to such configuration. For example, the support portion 32 may extend from the position offset from the center portion of the second connecting portion 311 in the long side direction of the second connecting portion 311.

In the above-mentioned embodiment, the frame 31 is configured such that one support portion 32 extends from one second connecting portion 311. However, the energy storage apparatus of this disclosure is not limited to such configuration. For example, as shown in FIG. 8, the frame 31 may be configured such that two or more support portions 32 extend from one second connecting portion 311 (FIG. 8 shows the frame 31 where two support portions 32 extend from one second connecting portion 311).

In the above-mentioned embodiment, the support portion 32 is configured to support the energy storage devices 1 by way of the oppositely-facing portion 22A of the spacer 2. However, the energy storage apparatus of this disclosure is not limited to such configuration. For example, the support portion 32 may support the energy storage devices 1 (the closed portions 100*a* of the energy storage devices 1) without interposing the spacer 2 between the support portion 32 and the energy storage device 1.

In the above-mentioned embodiment, it is described that the support portion 32 may preferably have rigidity. However, the energy storage apparatus of this disclosure is not limited to such configuration. For example, the support portion 32 may have elasticity.

In assembling the energy storage apparatus, the energy storage devices 1 are arranged on the support portion 32. In this case, when the energy storage devices 1 are pushed to the support portion 32, the support portion 32 is deflected corresponding to a force which the support portion 32 receives from the energy storage device 1.

Accordingly, when the support portion 32 has elasticity, in assembling the energy storage apparatus, it is possible to prevent the arrangement of the energy storage devices 1 at a predetermined position from becoming difficult. When the support portions 32 are deflected, the support portions 32 can support the energy storage devices 1 while pushing the energy storage devices 1.

In the above-mentioned embodiment, the holder 3 includes the terminal members 30 and the frames 31. However, the energy storage apparatus of this disclosure is not limited to such configuration. For example, when the frames 31 also function as the terminal members 30 (that is, when the frames 31 are fixed to the spacers 2 (the outer spacers 2B in this embodiment) arranged at both ends in the X axis direction), the holder 3 may not include the terminal members 30.

In the above-mentioned embodiment, the support portion 32 indirectly supports the closed portions 100*a* of the energy storage devices 1. However, the energy storage apparatus of this disclosure is not limited to such configuration. For example, the support portion 32 may directly or indirectly support the barrel portions 100*b* of the energy storage devices 1. Further, from a viewpoint of suppressing the lowering of a resonance frequency of the energy storage device group 5, the support portion 32 may support the energy storage devices 1 from below in the direction of gravity, or may support the energy storage devices 1 from the direction orthogonal to the direction of gravity.

In the above-mentioned embodiment, the support portion 32 is configured such that the second end portion is arranged at the position closer to the energy storage device group 5 than the first end portion is. However, the energy storage apparatus of this disclosure is not limited to such configuration. For example, the support portion 32 may be formed so as to straightly extend in the Y axis direction from the first end to the second end.

In the above-mentioned embodiment, the support portion 32 is formed such that the second end portion is arranged at the position closer to the energy storage device group 5 than the first end portion is by bending the second end portion so as to project toward the energy storage devices 1. However, the energy storage apparatus of this disclosure is not limited to such configuration. For example, the support portion 32 may be formed so as to approach the energy storage device group 5 as the support portion 32 extends to the second end portion from the first end portion. That is, the support portion 32 may be formed so as to extend from the second connecting portion 311 in the direction which intersects with the X axis direction as well as the Y axis direction.

In the above-mentioned embodiment, the support portion 32 is formed so as to directly or indirectly support the energy storage devices 1. However, the energy storage apparatus of this disclosure is not limited to such configuration. For example, the support portion 32 may be formed such that the support portion 32 can directly or indirectly support the energy storage devices 1.

The description is made more specifically. For example, the support portion 32 may be arranged in a spaced apart manner from the opposedly-facing portion 22A of the inner spacer 2A in the Z axis direction. With this configuration, when vibrations are applied to the energy storage device group 5, the support portion 32 is brought into contact with the opposedly-facing portion 22A of the inner spacer 2A and hence, the energy storage devices 1 are indirectly supported by the support portion 32.

In this manner, in the energy storage apparatus, it is not always necessary for the support portion 32 to be brought into direct or indirect contact with the energy storage devices 1. Provided that the energy storage apparatus is configured such that the support portions 32 are brought into direct or indirect contact with the energy storage devices when vibrations are applied to the energy storage device group 5, a resonance frequency of the energy storage device group 5 can be increased by the support portion 32.

What is claimed is:

1. An energy storage apparatus comprising:
an energy storage device group including a plurality of energy storage devices arranged in a row in a first direction, and a holder that holds the energy storage device group, the group includes two end energy storage devices at both ends of the group;
the holder includes a support portion that extends in a second direction orthogonal to the first direction and supports at least one of the energy storage devices arranged between the two end energy storage devices,
wherein the energy storage device group includes:
a terminal surface on which a plurality of external terminals are disposed; and
a bottom surface opposite to the terminal surface in a third direction which is orthogonal to the first and second directions, and
wherein the support portion extends along the bottom surface and includes:
a projection formed on a side of the support portion and projecting toward the at least one energy storage device in the third direction; and
a recess formed on an other side of the support portion.

2. The energy storage apparatus according to claim 1, wherein the support portion has rigidity.

3. The energy storage apparatus according to claim 1, wherein the support portion supports the energy storage device arranged at a center position in the first direction out of the energy storage devices that the energy storage device group includes.

4. The energy storage apparatus according to claim 1, wherein the holder includes a pair of terminal members that directly or indirectly sandwiches both ends of the energy storage device group in the first direction and a frame that connects the pair of terminal members to each other, and the support portion is formed on the frame.

5. The energy storage apparatus according to claim 4, wherein the frame includes a connecting portion extending in the first direction and forming a long side of the frame, and the support portion extends from the connecting portion in the second direction orthogonal to the first direction.

6. The energy storage apparatus according to claim 1, further comprising:
an inner spacer arranged between the energy storage devices adjacent to each other in the first direction out of the plurality of energy storage devices,
wherein the support portion supports the two energy storage devices through the inner spacer.

7. The energy storage apparatus according to claim 6, wherein a length of the support portion in the first direction is smaller than a length of the inner spacer in the first direction.

8. The energy storage apparatus according to claim 1, wherein a length of the support portion in the first direction is larger than a length of the energy storage device in the first direction.

9. The energy storage apparatus according to claim 1, wherein the support portion is configured to push the energy storage device.

10. The energy storage apparatus according to claim 1, wherein the support portion includes a first support portion and a second support portion, the first and second support portions being disposed co-planar along the bottom surface.

11. The energy storage apparatus according to claim 1, wherein the support portion includes a first support portion and a second support portion, the first and second support portions facing each other in the second direction which is perpendicular to the first direction.

12. The energy storage apparatus according to claim 11, wherein the holder further comprises:
first and second terminal members formed at the ends of the energy storage device group, respectively; and
first and second frames formed on opposing sides of the energy storage device group in the second direction, and connecting the first and second terminal members,
wherein the first and second support portions are formed on the first and second frames, respectively.

13. The energy storage apparatus according to claim 1, further comprising:
an insulator formed between the holder and the energy storage device group, and including an insulating portion formed between the support portion and the bottom surface of the energy storage device group.

14. The energy storage apparatus according to claim 13, wherein the insulating portion comprises a recessed portion, and the support portion is inserted into the recessed portion.

15. An energy storage apparatus comprising:
an energy storage device group including a plurality of energy storage devices arranged in a row in a first direction and including:
a terminal surface on which a plurality of external terminals are disposed; and a bottom surface opposite to the terminal surface; and a holder that holds the energy storage device group, the holder comprising:

first and second terminal members formed on opposing ends of the energy storage device group in the first direction;

a frame that connects the first terminal member to the second terminal member; and a support portion formed on the frame and supporting an energy storage device of the plurality of energy storage devices, the support portion extending in a second direction orthogonal to the first direction along the bottom surface of the energy storage device group and including:

a projection formed on a side of the support portion and projecting toward the energy storage device in a third direction orthogonal to the first and second directions; and a recess formed on an other side of the support portion.

16. The energy storage apparatus according to claim 15, further comprising:

a spacer formed between the plurality of energy storage devices, the support portion supporting the energy storage device through the spacer.

17. The energy storage apparatus according to claim 15, further comprising:

an insulator formed between the holder and the energy storage device group, and including an insulating portion formed between the support portion and the bottom surface of the energy storage device group.

18. The energy storage apparatus according to claim 17, wherein the insulating portion comprises a recessed portion, and the support portion is formed in the recessed portion.

19. An energy storage apparatus comprising:

an energy storage device group including a plurality of energy storage devices arranged in a row in a first direction, the plurality of energy storage devices including two end energy storage devices at opposite ends of the energy storage device group and an energy storage device between the two end energy storage devices, and the plurality of energy storage devices further including:

a terminal surface on which a plurality of external terminals are disposed; and a bottom surface opposite to the terminal surface;

a holder that holds the energy storage device group, the holder including a support portion that extends in a second direction orthogonal to the first direction and supports the energy storage device, the support portion extending along the bottom surface and including a projection which projects toward the energy storage device in a third direction orthogonal to the first and second directions;

an inner spacer arranged between adjacent energy storage devices out of the plurality of energy storage devices; and an insulator formed between the holder and the energy storage device group, the insulator including an insulating portion formed between the support portion and a bottom surface of the inner spacer.

20. The energy storage apparatus according to claim 1, wherein the support portion includes a first support portion and a second support portion, the first and second support portions facing each other in the second direction, wherein the holder further comprises:

first and second terminal members formed at the ends of the energy storage device group, respectively; and first and second frames formed on opposing sides of the energy storage device group in the second direction, and connecting the first and second terminal members, wherein the first and second support portions are formed on the first and second frames, respectively, and wherein a width of the first support portion in the first direction is less than a width of the first frame in the first direction and a width of the second support portion in the first direction is less than a width of the second frame in the first direction.

* * * * *